Sept. 3, 1963  A. W. ENGLE  3,102,604
SINGLE STRENGTH MEMBER FOR MULTI-TRANSDUCER MOUNTING
IN ACOUSTIC WELL LOGGING TOOLS
Filed Feb. 26, 1960  2 Sheets-Sheet 1

INVENTOR
*Allen W. Engle*
BY Robert K. Schumacher
ATTORNEY

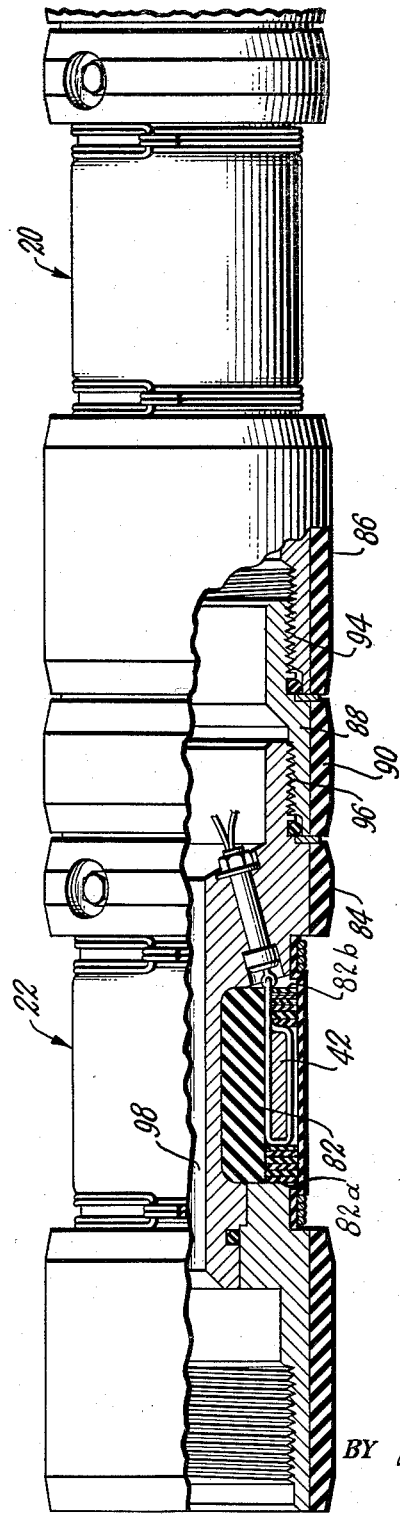

United States Patent Office 3,102,604
Patented Sept. 3, 1963

3,102,604
SINGLE STRENGTH MEMBER FOR MULTI-TRANSDUCER MOUNTING IN ACOUSTIC WELL LOGGING TOOLS
Allen W. Engle, Tulsa, Okla., assignor, by mesne assignments, to Dresser Industries, Inc., Dallas, Tex., a corporation of Delaware
Filed Feb. 26, 1960, Ser. No. 11,298
2 Claims. (Cl. 181—.5)

The present invention relates to acoustic well logging tools and has more particular reference to mounting on a single strength member several transducers that may be closely spaced together without receiving acoustic energy in the receiving transducers before desirable acoustic energy is received from the formations of the borehole adjacent the tool.

In acoustic well logging it is common to transmit a pulse of acoustic energy and measure the time necessary for acoustic energy to traverse a known length of formations disposed along an acoustic well logging tool in a borehole. Further, it is common to use the first arrival of acoustic energy following the transmission of the pulse to mark time, since any later energy is confused by energy arriving through various paths, whereas the energy arriving first is unique. It is therefore essential that the energy which is first received arrive by way of the surrounding formations rather than by way of the tool itself. To avoid having energy travel fastest down the tool itself, some means must be taken to isolate the acoustic receivers. This is not a simple problem for the acoustic transducers must be spaced by a substantially unvarying amount, since the measurement must be made of the time necessary for the sound to travel this fixed length.

An acoustic well logging tool must withstand substantial tensional forces to maintain transducer spacing and it is therefore necessary to provide a high strength member in mounting the transducers in the tool. In any of the high tensile materials such as steel, the velocity of sound in the material is high, e.g., 17,600 ft./sec. for steel. Many formations about boreholes have a substantially lower velocity for passing acoustic energy than steel, and therefore it becomes difficult, if not impossible, to measure accurately the velocity of acoustic energy in these formations without isolators, since the acoustic energy would be conveyed to the receiving transducers and received before acoustic energy is received through the formations.

It has been the practice in acoustic well logging tools to use acoustic isolators or insulators extending longitudinally between transmitting transducers and receiving transducers and also between pairs of receiving transducers. These acoustic isolators are designed to attenuate, filter and particularly reduce the flow of acoustic energy from the transmitting transducer to receiving transducer, and also between the pairs of receiving transducers.

For relatively long distances between a transmitting transducer and receiving transducers, and between pairs of receiving transducers, these isolators are found to be satisfactory but are difficult and not practical to build where a short separation of transducers is required.

The range of velocities of transmission of acoustic energy which are to be measured along a borehole vary from 5,000 ft./sec. for water and drilling muds to 25,000 ft./sec. for dolomites, with shales in the range of 9,000–12,000 ft./sec.

With relatively short spacings between pairs of transducers, it has been found satisfactory to provide some lateral acoustic delay and attenuation, where there is insufficient length to provide this longitudinally when high tensile materials are used to construct a high strength member. This is done by using a material which has a low velocity for transmitting acoustic energy and also may have good attenuation properties disposed between the transducers and the supporting mounting. One of these materials is rubber.

When the proper amount of rubber is placed around the steel mounting on which the transducers are mounted, it is possible to prevent any acoustic energy travelling longitudinally along the mounting from being received by the receiving transducers before the energy is received from the formations.

In practice it is well to cover the transducers with a rubber boot or sleeve and fill the void space inside of the cover with an oil such as DC200, castor oil, or any material with good specific acoustic impedance match with water. In addition, this material must have a low transmission velocity for sound energy when no baffle is used between closely spaced transducers, to delay acoustic energy which would otherwise travel fastest through this material rather than through the formations.

More receivers could be used than the two shown in the illustrations. In addition, it is possible to mount a transmitter on the same sort of mount.

Therefore, it is an object of the present invention to provide a mounting for acoustic transducers for preventing the reception of any acoustic energy by at least one receiving transducer before it is received from the surrounding borehole.

A further object of the present invention is to provide a steel mounting encased in rubber or neoprene so that a single mounting structure is used for mounting a plurality of acoustic energy receiving transducers that are closely positioned thereon.

A further object of the present invention is to provide a multi-transducer mounting for an acoustic well logging tool, wherein an acoustic baffle is provided between the transducers for attenuating and delaying the passage of acoustic energy between the transducers.

A yet further object of the invention is to provide a single strength member on which may be mounted multitransducers without having acoustic coupling along the strength member from one transducer to the next transducer.

The above and other objects and advantages of the invention will be best understood in view of the following detailed description, taken in connection with the accompanying drawings, in which:

FIGURE 3 is generally a cross-sectional view of a portion of an acoustic well logging tool showing a sectional strength member for mounting two transducers in accordance with another embodiment of the present invention.

Figure 1:
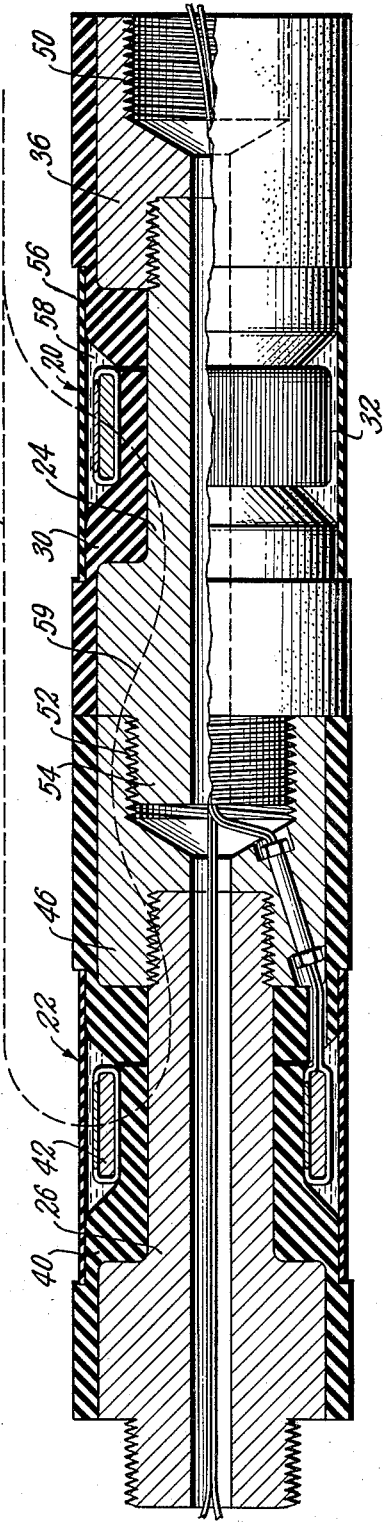
FIGURE 1 is generally a cross-sectional view along the length of a portion of an acoustic well logging tool showing two transducers mounted on rubber secured to a single strength member.

Referring now to FIG. 1, there are shown acoustic transducer assemblies 20, 22 mounted on central strength members 24, 26.

On the strength member 24 there is secured a rubber or neoprene insulation or isolation material 30. The material may be coaxially fitted onto the strength member 24, and an acoustic transmitting or receiving transducer 32 has been applied over the isolation material. Then the isolation material with the transducer thereon is held onto the strength member 24 by a coupling 36.

The acoustic transducer assembly 22 is similarly constructed, as shown, so that an isolation structure 40 may be fitted snugly and coaxially onto the strength member 26, and an acoustic receiving transducer 42 is mounted over the isolation structure. An intermediate coupling 46 is used to secure the transducer assembly 22 securely onto the strength member 26.

The coupling 36 has a female coupling 50 for threadedly receiving a connecting coupling (not shown) of the tool for assembly of the tool into one unit, and the coupling 46 has a female coupling 52 for threadedly receiving a connecting coupling 54 of the strength member 24.

The acoustic transducers 32, 42 are each covered by an outer rubber boot or sleeve 56 and the void 58 between the sleeve and the isolation structure 30, 40 is filled with an oil such as DC200, castor oil, or any other material having a characteristic acoustic impedance matching that of well fluid.

The thickness of the isolation material is sufficient in dimension and composition characteristics to form a path for laterally delaying and attenuating the acoustic energy that passes along path 59. The material forms a part of the path, and the delay and attenuation is sufficient so that the amplitude of the acoustic energy arriving at transducer 42 through the strentgh members 24, 46, 26 is less than the amplitude of the acoustic energy first arriving at transducer passing along a path 59a through rock formations at least until receipt at transducer 42 of the energy first arriving after passing along path 59a. The velocity of sound in typical formations may be as low as 5,000 ft./sec. or 8,000 ft./sec.

In this manner there is provided a construction for isolating substantially all the acoustic energy from being received by the receiving transducer 42 along path 59 before the acoustic energy along path 59a has been received in substantial amount by the receiving transducer 42, when the acoustic energy has been initiated by an external source (not shown).

Figure 2:
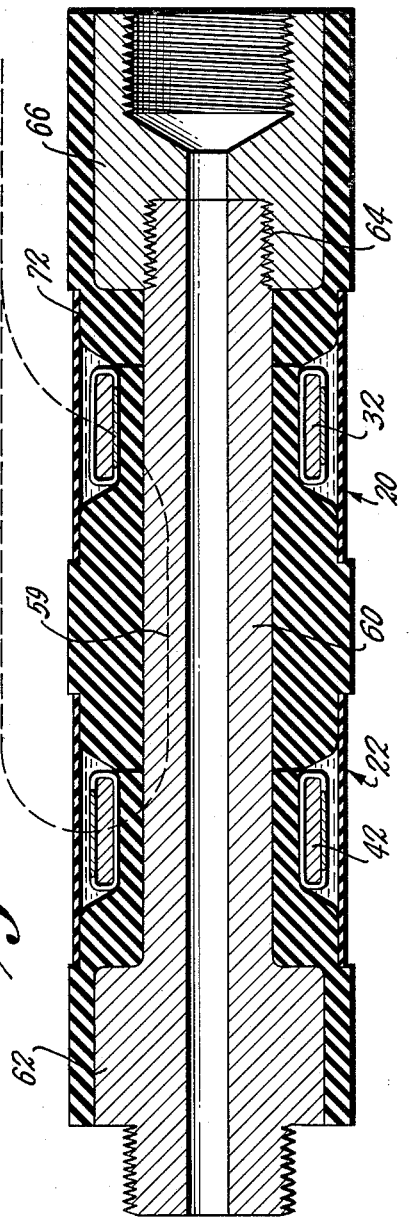
FIGURE 2 is generally a cross-sectional view of a dual transducer mounting upon a single strength member for an acoustic well logging tool according to a further embodiment of the invention.

In FIG. 2, acoustic transducers 32, 42 are shown mounted on a core 60 having one end including an enlarged portion 62 and the other end having a threaded coupling 64 for engaging an end coupling 66. The isolation material 72 is of a single piece construction, although it may clearly be similarly constructed of several pieces. Between the receiving transducers, the material extends outwardly so that a baffle portion is formed therebetween. The transducers 32, 42 are closely mounted together.

The embodiment of the invention in FIG. 3 shows separately coupled units forming closely mounted receiving transducers for an acoustic well logging tool.

However, in FIG. 3 the isolation material 82 is sufficient in thickness to delay and attenuate the passage of acoustic energy along any path internal of the tool, and a short coupling 88 with its isolation covering 90 may be constructed so that the receiving transducers are substantially close together. It is within the purview of the invention to omit completely the short coupling 88, and connect directly together the assemblies 20, 22 by the threaded coupling 94, 96.

General features of acoustic transducer assemblies may be included in the transducer assemblies 20, 22 of the invention. This includes providing longitudinal openings 98 along the length of the assemblies for the passage of wires, etc.

In practice it has been found desirable to space the pair of receiving transducers apart by one foot, center to center. With such spacing and with transducers of the type preferentially radially sensitive, as is the case with scroll type magnetostrictive transducers of the shape illustrated, it has been found that the isolation provided by ⅝ inch of radial thickness of isolation material 82 between the receiving transducers and the steel stress member provided satisfactory delay and attenuation, when the upper and lower edges of these transducers were separated from the steel stress member by ⅛ inch of similar isolation material in the form of washers 82a and 82b.

It will be thus apparent that the new apparatus provides a simple construction for mounting transmitting and receiving transducers substantially close to each other without allowing acoustic energy passing within the tool between the transducers from interfering with the reception of acoustic energy by the transducers from the rock formations of the borehole.

It should be understood, however, that the specific apparatus herein illustrated and described is intended to be representative only, as many changes may be made therein without departing from the clear teachings of the invention. Accordingly, reference should be made to the following claims in determining the full scope of the invention.

What is claimed is:

1. An acoustic velocity well logging instrument comprising
a single steel strength member,
at least two acoustic energy transducers spaced along and laterally from said strength member, and
delay means composed of rubber-like material interposed to fill substantially all space existing directly between said member and said transducers and directly between said transducers in a manner to conduct acoustic energy between said transducers by way of said member at a velocity less than 5,000 feet per second.

2. An acoustic velocity well logging instrument comprising
a single strength member formed of a high tensile strength metal conductive of acoustic energy at a velocity of at least 5,000 feet per second,
at least two acoustic energy transducers spaced along and laterally from said strength member, and
delay means composed of elastic material interposed to fill substantially all space existing directly between said member and said transducers and between said transducers in a manner to conduct acoustic energy between said transducers by way of said member at a velocity less than 5,000 feet per second.

References Cited in the file of this patent

UNITED STATES PATENTS

| | | |
|---|---|---|
| 2,757,358 | Ely | July 31, 1956 |
| 2,784,796 | Overton | Mar. 12, 1957 |
| 2,790,964 | Schurman | Apr. 30, 1957 |
| 2,868,311 | Tullos | Jan. 13, 1959 |
| 2,878,886 | Overton | Mar. 24, 1959 |
| 2,943,694 | Goodman | July 5, 1960 |
| 3,009,131 | Woodworth | Nov. 14, 1961 |